United States Patent Office 3,236,862
Patented Feb. 22, 1966

3,236,862
SPIROIMIDES
Charles H. Grogan, Falls Church, and Charles F. Geschickter, Lorton, Va., assignors to The Geschickter Fund for Medical Research, Inc., Washington, D.C., a corporation of New York
No Drawing. Continuation of applications Ser. No. 94,143, Mar. 8, 1961, and Ser. No. 176,903, Mar. 2, 1962. This application Aug. 4, 1964, Ser. No. 387,503
10 Claims. (Cl. 260—326.5)

This application is a continuing application with respect to applicants' copending applications S.N. 94,143, filed March 8, 1961, and S.N. 176,903, filed March 2, 1962, both now abandoned, the benefit of the filing dates of which applicants claim under 35 U.S.C. 120.

The present invention relates to novel, synthetic organic chemical compounds having significant medicinal value as peripheral and central relaxants. More specifically, the invention relates to substituted-2-azaspiro[4.4]nonane-1,3-diones.

A primary object of this invention is to provide novel, synthetic organic chemical compounds.

Another object of the invention is to provide novel, therapeutically useful, synthetic organic chemical compounds having medicinal utility as muscle and central nervous relaxants.

These and further objects and advantages of the present invention will become apparent from the following description of the novel compounds discovered and the useful pharmacological activity which they possess.

The novel compounds of the present invention are shown by Formula 1:

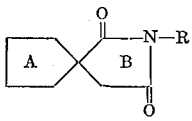

wherein rings A and B together constitute the 2-azaspiro[4.4]nonane nucleus, each ring taken separately containing 5 atoms; and R is a non-aromatic hydrocarbon group of 2 to 6 carbon atoms containing unsaturated carbon-carbon bonds. While, as noted, R may be any non-aromatic hydrocarbon group of 2 to 6 carbon atoms containing unsaturated carbon-carbon bonds, including open chain and cyclic substituents, the former are preferred. While ring A is shown in Formula 1 as being unsubstituted, ring A may be substituted as well. Examples of groups which may be substituted on ring A are alkyl and alkenyl, preferably containing no more than 6 carbon atoms. Examples of alkyl groups which may be substituted on ring A are methyl; hexyl; dodecyl; etc. Examples of alkenyl groups which may be substituted on ring A are allyl; hexenyl; dodecenyl; etc. While there is no limit on the chain length of the alkyl or alkenyl substituents insofar as the relaxant activity of the overall compound is concerned, decreasing solubility of the compounds with increasing chain length of these substituents may render them less practical to use than those with the preferred chain lengths as indicated above. Quite obviously, the alkyl or alkenyl substituents on ring A can be in any of the 6, 7, 8 or 9 positions on this ring.

It has been found by pharmacological and clinical observation that both peripheral and central relaxing effects are obtained through the use of compounds within the generic formula above, and slight variations in ring size or substituents greatly diminished or abolished this effect, increased toxicity or even elicited stimulatory or convulsant activities.

For example, 2-allyl-2-azaspiro[4.4]nonane-1,3-dione is a very good relaxant, producing these pharmacological effects in animals and controllable, efficacious clinical responses in humans. In rats, the $LD_{50}$ by intraperitoneal administration is over 500 mg./kg. while doses of 100 mg./kg. produce relaxation and higher doses extreme relaxation with sleep. Substitution of a methyl group on ring A greatly enhances the relaxing effect, with little increase in toxicity and also adds a central component of activity which is best described in general terms as mood improvement. Use of a methallyl group as the substituent R again gives good relaxant properties with slight increase in toxicity, [$LD_{50}$ over 350 mg./kg.].

To demonstrate how specific this property is to the structural group shown by Formula 1, variations both in ring size and N-substituent R were made. When the non-aromatic unsaturated R groups were compared to saturated alkyl groups, it was found that the relaxant properties were greatly decreased, abolished or reversed. The N-methyl analog possessed a low toxicity, $LD_{50}$ over 500 mg./kg., but showed only fleeting relaxant effect of few minutes duration at doses near the toxic level and at doses which produced noticeable respiratory difficulty. The N-propyl derivative, while still not toxic, showed no animal or clinical relaxation and definite respiratory difficulty at dosage levels that produced any noticeable effect. When the sizes of rings A and B were altered, the relaxant effect was entirely abolished, toxicity increased and stimulatory or convulsant activity was the primary action. For instance, if ring A is increased to 6 atoms, i.e., 2-azaspiro[5.4]decane, and R is kept at allyl for comparison with the active allyl derivatives of the 2-azaspiro[4.4]nonane nucleus, the $LD_{50}$ is about 125 mg./kg. and the action is convulsant. Similarly, if the N-allyl imide of 3-azaspiro[5.5]undecane is used, the activity is convulsant. Thus, while substituents on ring A may be varied without loss of the basic relaxant activity, any increase in size of rings A or B results in greatly diminished activity, increased toxicity or convulsant or stimulatory properties. By the same token, removal of the non-aromatic unsaturated R group and its replacement by hydrogen, lower alkyl or aromatic groups diminishes relaxant activity to non-useful levels, abolishes relaxant properties completely, or results in stimulants or convulsants.

It is thus apparent that a unique set of pharmacological and clinical properties is attributable to compounds shown by Formula 1 and that very slight variations of the basic structure result in the abolition of these properties or the appearance of different pharmacological and clinical actions. Clinically, these compounds are administered to patients to produce relaxant, sedative or tranquilizing effects at dosages of from 70 to 75 mg. intramuscularly once daily or, if desired, in the form of 50 mg. capsules to be taken orally three times daily.

The compounds of the present invention may be made by reaction of the anhydrides of cyclopentane-1-carboxy-1-acetic acids with appropriate unsaturated amines such as allylamine, methallylamine, crotylamine, propargylamine, cyclohexenylamine, cyclopentenylamine, etc. to form the corresponding amic acids and heating at a temperature sufficient to cyclize the amic acid to the corresponding imide.

The following examples will illustrate the preparation of representative compounds:

*Example 1.—2-allyl-2-azaspiro[4.4]nonane-1,3-dione*

Twenty grams (0.13 mole) of the anhydride of cyclopentane-1-carboxy-1-acetic acid was placed in a round bottom 24/40 flask, a large excess of allylamine added (due to the volatility of the amine) and the reactants mixed by stirring and swirling until the initial exothermic reaction subsided. This procedure results in the loss by evaporation of a large amount of the allylamine since the temperature of the reactants rises rapidly to the vicinity of 120–140° C. The flask was weighed back to ascertain if a minimum of 0.13 mole of allylamine remained. (If not, more must be added and the mixture rendered homogeneous by stirring.) The flask and contents were then slowly heated in an oil bath until a temperature of 180° C. was reached and all evolution of vapor ceased. At this point, cyclization of the initially formed amic acid to the desired imide was completed and the product was isolated by distillation in vacuo from the reaction vessel. There was obtained 94% of the imide as a colorless oil (B.P. 74–75° C./0.25 mm.). The substance had a pleasant, sweet, fruity odor in low concentrations and a slightly piquant effect at higher concentrations of the vapor.

In order to avoid loss of allylamine due to its volatility, the reactants may be mixed in an inert solvent, such as benzene, in which they are both soluble. The amic acid is thus formed in solution and, after removal of the solvent, the cyclization and distillation may be conducted as described above.

*Example II.—2-allyl-7-methyl-2-azaspiro[4.4]nonane-1,3-dione*

This imide was obtained in 92% yield as a colorless oil (B.P. 94–96° C./0.4 mm.) from the reaction of one-tenth molar quantities of the anhydride of 3-methyl-cyclopentane-1-carboxy-1-acetic acid and allylamine, cyclization and distillation as described above in Example I.

*Example III.—2-methallyl-7-methyl-2-azaspiro[4.4]nonane-1,3-dione*

Reaction of 0.1 mole of the anhydride of 3-methyl-cyclopentane-1-carboxy-1-acetic acid and a slight excess of methallylamine, cyclization and isolation as described in Example I yielded the title imide as a colorless oil (B.P. 88–93° C./0.05 mm.; yield 95%).

Many other examples of compounds coming within the framework of the inventive concept of this application may be enumerated. Merely by way of illustration, such additional compounds include: 2-allyl-8-nonyl-2-azaspiro[4.4]nonane-1,3-dione; 2-allyl-6-hexyl-2-azaspiro[4.4]nonane-1,3-dione; 2-allyl-9-dodecyl-2-azaspiro[4.4]nonane-1,3-dione; 2-allyl-7-allyl-2-azaspiro[4,4]nonane-1,3-dione; 2-methallyl-6-hexenyl-2-azaspiro[4,4]nonane-1,3-dione; 2-allyl-8-dodecenyl-2-azaspiro[4.4]nonane-1,3-dione; etc.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A compound of the formula

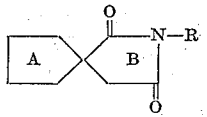

wherein R is a non-aromatic hydrocarbon group having unsaturated carbon-carbon bonds of 2–6 carbon atoms.

2. The compound defined in claim 1 wherein an alkyl group is substituted on ring A.

3. The compound defined in claim 2 wherein said alkyl group has no more than 6 carbon atoms.

4. The compound defined in claim 1 wherein an alkenyl group is substituted on ring A.

5. The compound defined in claim 4 wherein said alkenyl group has no more than 6 carbon atoms.

6. The compound defined in claim 1 wherein R is a non-aromatic open chain hydrocarbon group having unsaturated carbon-carbon bonds of 2–6 carbon atoms.

7. The compound defined in claim 1 wherein R is a non-aromatic cyclic hydrocarbon group having unsaturated carbon-carbon bonds of 2–6 carbon atoms.

8. 2-allyl-2-azaspiro[4.4]nonane-1,3-dione.

9. 2-allyl-7-methyl-2-azaspiro[4.4]nonane-1,3-dione.

10. 2-methallyl-7-methyl-2 - azaspiro[4.4]nonane - 1,3-dione.

References Cited by the Examiner

UNITED STATES PATENTS 3,150,143   9/1964   Grogan et al. _____ 260–281

OTHER REFERENCES

Gupta et al., "J. Indian Chemical Society," vol. 29, pages 438–442 (1952).

Gupta et al., "J. Indian Chemical Society," vol. 31, pages 285–290 (1954).

Marshall et al., "J. Pharmacy and Pharmacology," vol. 6, pages 740–746 (1954).

NICHOLAS S. RIZZO, *Primary Examiner.*